United States Patent [19]

Band et al.

[11] Patent Number: 4,889,519

[45] Date of Patent: Dec. 26, 1989

[54] COORDINATE MEASURING MACHINE

[75] Inventors: Gerhard Band, Oberndorf; Heinz Broghammer, Zimmern, both of Fed. Rep. of Germany

[73] Assignee: Mauser-Werke Oberndork GmbH, Oberndorf, Fed. Rep. of Germany

[21] Appl. No.: 230,469

[22] Filed: Aug. 9, 1988

[30] Foreign Application Priority Data

Sep. 5, 1987 [DE] Fed. Rep. of Germany ....... 3729813

[51] Int. Cl.⁴ ............................................. F16H 7/08
[52] U.S. Cl. .................................. 474/101; 474/114; 474/135
[58] Field of Search .............. 474/101, 109, 111, 113, 474/114, 115, 117, 133, 135; 188/17, 18 A, 72.9

[56] References Cited

U.S. PATENT DOCUMENTS

| | | | |
|---|---|---|---|
| 3,004,443 | 10/1961 | Gerrans | 474/114 X |
| 3,262,330 | 7/1966 | Cheatum | 474/135 X |
| 3,977,266 | 8/1976 | Tantlinger | 474/135 X |
| 4,561,624 | 12/1985 | Freeman | 474/114 X |

FOREIGN PATENT DOCUMENTS 3514961 4/1985 Fed. Rep. of Germany .

*Primary Examiner*—Thuy M. Bui
*Attorney, Agent, or Firm*—Scully, Scott, Murphy & Presser

[57] ABSTRACT

A coordinate measuring machine with a drive and braking arrangement for a spindle sleeve which is displaceable in the Z-direction through the intermediary of a threaded spindle. A motor power output or take-off shaft and the threaded spindle, which are arranged axially-parallel relative to each other, are in a driving connection with each other through the interposition of a belt drive with a belt tensioning and supervisory or monitoring arrangement, whereby a brake pulley is flange mounted to the belt pulley for the drive of the threaded spindle, and a braking clamp or a disc brake acts on the brake shoes.

7 Claims, 2 Drawing Sheets

COORDINATE MEASURING MACHINE

BACKGROUND OF THE INVENTION

1. Field of the Invention

The present invention relates to a coordinate measuring machine with a drive and braking arrangement for a spindle sleeve which is displaceable in the Z-direction through the intermediary of a threaded spindle.

2. Discussion of the Prior Art

From the disclosure of German Laid-Open Patent Appln. No. 35 14 961, there has become known a drive arrangement on a coordinate measuring machine, which serves for the movement of a spindle sleeve in the Z-direction through the utilization of a threaded spindle. This published patent specification relates to the aspect that a radial impact against the threaded spindle is not transmitted to the spindle sleeve, and additionally it is possible to encounter a movement about a wobble or tumbling axis. However, there is no discussion in this publication with respect to the drive and the braking of the threaded spindle for effectuating the movement of the spindle sleeve.

Heretofore, it has been known in the practice to employ an electric motor with a brake for the drive of the threaded spindle. In that instance, the driving force was transmitted from the motor shaft through a metal bellows coupling to a stub shaft, on which there were supported a permanent magnet brake and a wide drive pulley for two pulley belts. For this type of dual-belt drive, it was necessary to provide a dual belt supervision and dual belt tensioners.

SUMMARY OF THE INVENTION

Accordingly, commencing from the above-mentioned current state-of-the-technology, it is an object of the present invention to provide a coordinate measuring machine with a drive and braking arrangement of the above-mentioned type which is of a simple kind of construction, and which acts directly on the threaded spindle for the spindle sleeve which is displaceable in the Z-direction.

The foregoing object is achieved in an inventive manner, in that the motor power output or take-off shaft and the threaded spindle, which are arranged axially-parallel relative to each other, are in a driving connection with each other through the interposition of a belt drive with a belt tensioning and supervisory or monitoring arrangement, whereby a brake pulley is flange mounted to the belt pulley for the drive of the threaded spindle, and a braking clamp or a disc brake acts on the brake shoes.

Hereby, in accordance with a feature of the invention, the belt pulley, which is supported on the motor power output shaft, can be made adjustable transversely of the longitudinal axis of the motor power output shaft, through the intermediary of a motor mount which is displaceable and fastenable in slotted holes. The second belt pulley, in conjunction with the brake pulley which is flange connected therewith so as to be secured against rotation, can be supported secured against rotation on the threaded spindle of the spindle sleeve. Thereby, the second belt pulley together with the brake pulley can be secured on the threaded spindle by means of a clamping sleeve. Moreover, a further securing is obtained in that the second belt pulley and the brake pulley are additionally secured on the threaded spindle by a driving pulley which engages into a longitudinal groove which is machined into the threaded spindle.

Pursuant to yet another feature of the invention, for the supervision of the belt tension and the belt moving movement, there can be mounted on a safety limit switch which is in connection with a double-row ball bearing on the belt. In this case, the belt tensioner can be an angle lever which, under the action of a biasing force, contacts against the belt with a roller or a runner, and which pivots through a central axis by means of a motor unit. The technological improvement of the drive and braking arrangement lies in the relatively simple construction and the secure functioning, especially inasmuch as the braking arrangement acts directly on the threaded spindle. It is of further advantage that, in the selected drive arrangement, the provision of only a single belt is sufficient, since the new disc brake acts directly on the threaded spindle.

In order to facilitate the tensioning of the pulley belt in a simple manner, the motor mount plate is displaceable by means of slotted holes in a direction away from the large belt pulley of the threaded spindle. The new belt supervision with the safety limit switch and a double-row ball bearing are mounted on for improved contact against the belt. The brake pulley is directly flange-connected and secured to the second belt pulley of the threaded spindle. The belt pulley together with the brake pulley is connected by means of a clamping sleeve with the threaded spindle. For the further assurance of this coupling, and also to afford a problemless functioning, even with material errors and assembling errors, in accordance with further features of the invention, there is provided a special driving pulley which engages with play into a groove which is machined into the shaft. Even upon failure of the connection by the clamping sleeve, provides for a positive or forcible drive.

BRIEF DESCRIPTION OF THE DRAWINGS

Reference may now be had to the following detailed description of an exemplary embodiment of the invention, taken in conjunction with the accompanying drawings; in which:

FIG. 1A is an enlarged view, partially in cross-section, of a portion of the drive and breaking apparatus shown in FIG. 1;

DETAILED DESCRIPTION

Figure 1:
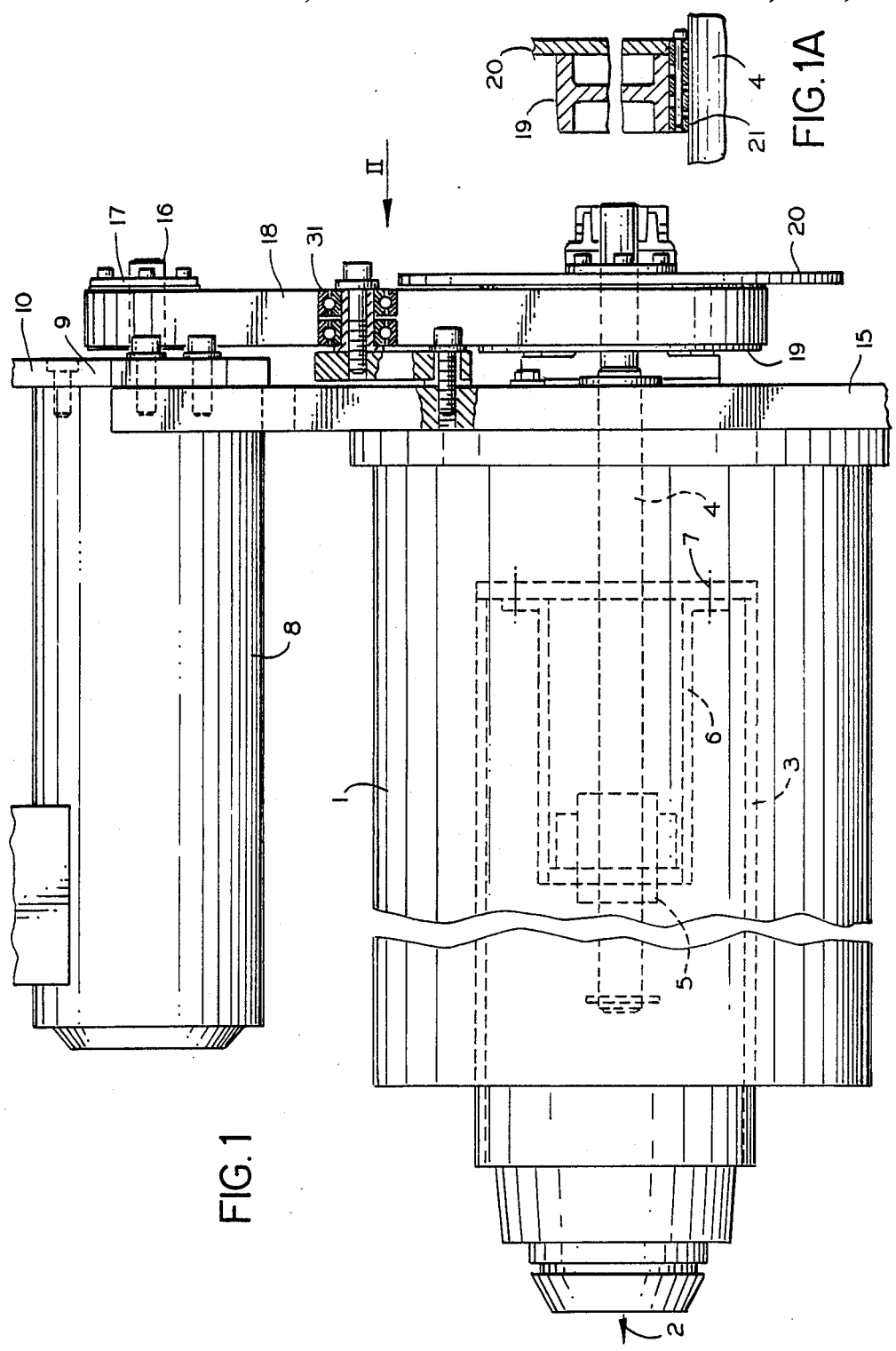
FIG. 1 illustrates a side view, partly in section, of the drive and braking arrangement for the threaded spindle of a spindle sleeve on a coordinate measuring machine.
Figure 2:
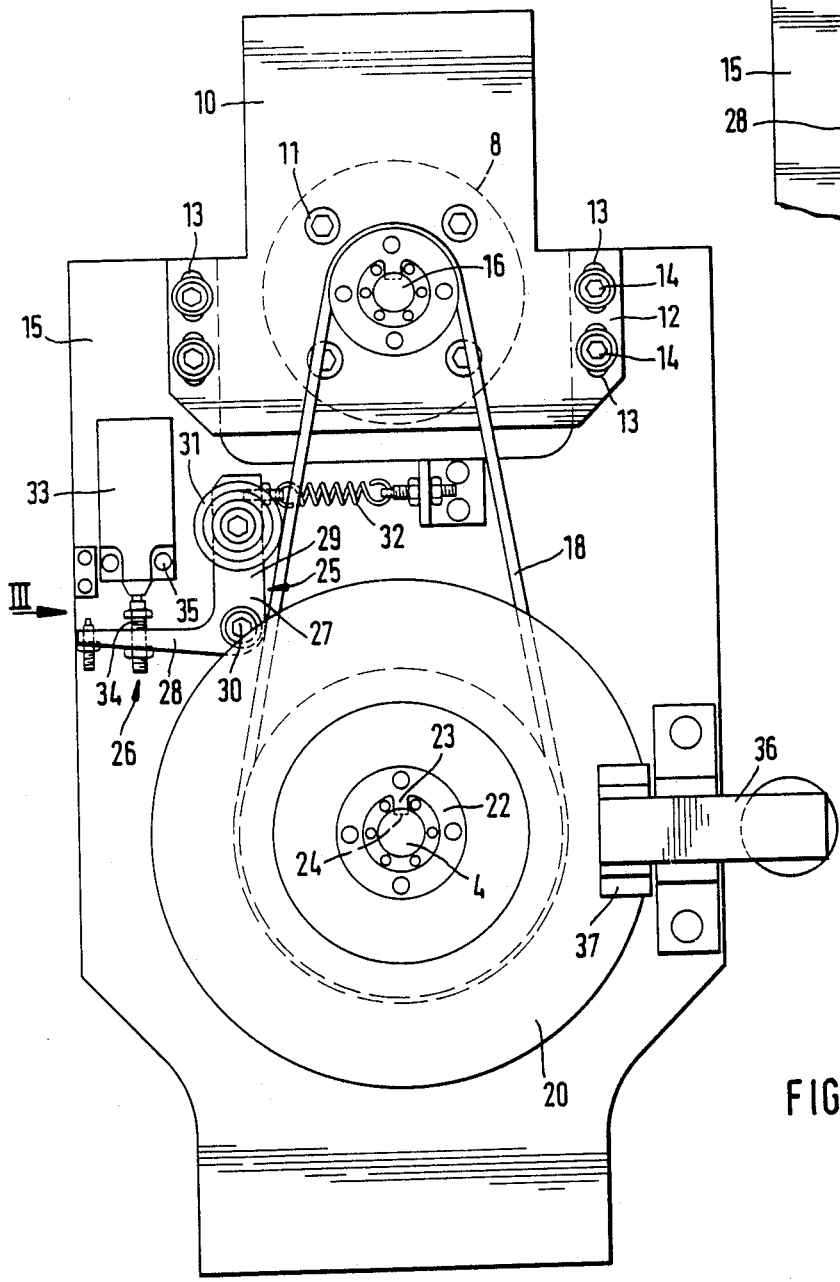
FIG. 2 illustrates the arrangement of FIG. 1 in the direction of arrow II in FIG. 1.
Figure 3:
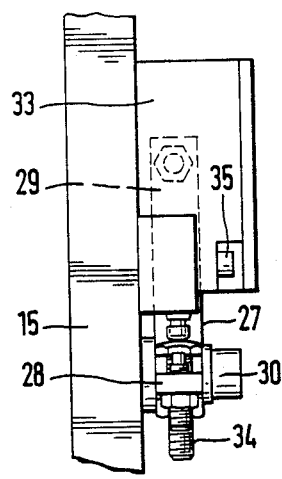
FIG. 3 illustrates a plan view of the belt supervising arrangement in the direction of arrow III in FIG. 2.

Arranged on a coordinate measuring machine (not shown in detail) within a housing 1 is a spindle sleeve 3 which is displaceable in the Z-direction 2. The movement of the spindle sleeve 3 in the Z-direction is effectuated through a threaded spindle 4, on which there is arranged a locking nut 5 so as to be axially displaceable but secured against rotation.

The locking nut 5 is in fixed connection with a nut housing 6 which, in turn, is connected with the spindle sleeve; for instance, through the use of screws 7.

The drive of the threaded spindle 4 is carried out with the intermediary of an electric motor 8 which is arranged axially parallel therewith. The front end surface 9 of the electric motor 8 is connected to a motor mount plate 10 by means of screws 11. Slotted holes 13 are formed in side lugs 12 of the motor mount plate 10, into which screws 14 are inserted in order to be able to mount the motor mount plate in conjunction with the electric motor 8 on a stationarily fixed structural component. The position of the slotted holes 13 is hereby dimensioned in such a manner, that there can be carried out a displacement of the motor mount plate 10 together with the electric motor 8 perpendicularly of the axially-parallel threaded spindle 4. As a result thereof, it is finally possible to implement a belt tensioning between the threaded spindle 4 and the motor power output or take-off shaft 16, which projects from the end surface of the motor 8 and the motor mount plate 10.

Supported on the motor power output or take-off shaft is a belt pulley 17 so as to be secured against rotation and against axial displacement. An endless belt 18 represents the drive connection between the belt pulley 17, the motor power output shaft 18, and the second belt pulley 19 of the threaded spindle 4. Flange-connected so as to be secured against rotation to the second belt pulley 19, at the end surface, is a brake pulley 20, which can be effectuated; for example, through a screw connection. The second belt pulley 19 in conjunction with the brake pulley 20 is secured against rotation on the threaded spindle by means of a clamping sleeve 21, illustrated in FIG. 1A. An additional securing for a rotary drive for the belt pulley 19 together with the brake pulley 20 on the threaded spindle 4 is implemented by a securing ring 22 which has a projection 23 engaging into an elongate groove 24 in the threaded spindle 4.

The brake shoes 37 of a brake clamp 36 are in an operative connection with the brake pulley disc 20, which brake clamp is fixedly mounted radially outside of the brake pulley 20 on the stationary structural component 15.

The brake pulley 20, due to reasons of weight, is constructed relatively narrow, for example, only 5 mm.

In order to obtain an adequate belt tensioning of the endless belt 18 for the constantly assured rotary drive of the threaded spindle 4, towards the side of the belt 18 there is provided on the stationary structural component a belt tensioning device 25 with a supervising installation 26 for the belt tension. Hereby, by belt tensioning device is constituted of an angle lever 27, both arms 28 and 29 of which are pivotable about the central axle 30. A double-row ball bearing 31 is rotatably arranged on the lever arm 29 for contact against the belt 18. This double-row ball bearing 31 is maintained in constant contact with the belt 18 with the aid of a tension spring 32. The tensioning of the belt is supervised or monitored by a safety limit switch 33 which stands in connection with the second lever arm 28 of the angle lever 27 by means of a screw 34. In turn, the switch 33 is again connected with the stationary structural component 15 through the intermediary of screws 35.

The advantages of this drive and braking arrangement for the threaded spindle of a spindle sleeve in a coordinate measuring machine can be ascertained in that the first belt pulley 17 is directly supported on the motor power output shaft 16 and that only a single belt serves as the transmission element, as a consequence of which, it is possible that this disc or pulley brake 20, 37 acts directly on the threaded spindle 4 for the movement of the spindle sleeve 3. The tensioning of the belt 18 can be carried out in a simple manner through displacement of the motor mount plate 10 within the slotted holes 13. An improved contact of the belt tensioning arrangement and of the belt tension monitoring installation is achieved by the double-row ball bearing 31 and the safety limit switch 33. The brake pulley 20 is screwed directly to the second belt pulley 19 and secured thereon. The belt pulley in conjunction with the brake pulley 20 is supported by means of a clamping sleeve 21 on the threaded spindle 4 for a rotary driving. An additional assurance for this clamping sleeve connection is undertaken with an additional safety pulley 22, such that even in the event of encountered material or assembly errors, there is afforded the rotary drive of the belt pulley 19 on the threaded spindle 4.

What is claimed is:

1. A coordinate measuring machine comprising:
   a spindle sleeve supported for movement in a first direction;
   a threaded spindle extending along and supported for rotary movement about a first axis, and connected to the spindle sleeve to move aid sleeve in the first direction;
   a motor including a power output shaft, and adapted to rotate said output shaft about a second axis parallel to the first axis;
   drive means connecting the power output shaft to the threaded spindle to rotate said threaded spindle, and including
   (i) a first pulley mounted on the power output shaft for rotation therewith,
   (ii) a second pulley mounted on the threaded spindle for rotation therewith,
   (iii) a drive belt mounted on and extending around the first and second pulleys in driving engagement therewith, wherein rotation of the first pulley drives the belt around the first and second pulleys and rotates the second pulley, and
   (iv) means engaging the drive belt to maintain tension thereon;;
   a brake pulley directly connected to the second pulley for rotation therewith; and
   break means including a break shoe to selectively engage the break pulley to apply a braking force thereto and to the second pulley and the threaded spindle.

2. A coordinate measuring machine according to claim 1, further comprising:
   a stationary structure;
   means connecting the motor to the stationary structure, and including
   (i) a motor mount, at least one of the stationary structure and the motor mount forming a plurality of elongated slots extending in a direction perpendicular to said second axis,
   (ii) means connecting the motor to the motor mount, and
   (iii) a plurality of bolts extending through the elongated slots and connecting the motor mount to the stationary structure to releasably hold the motor and the power output shaft in a position adjustable in the direction perpendicular to said second axis.

3. A coordinate measuring machine according to claim 1, further including means connecting the break pulley directly to the threaded spindle for rotation therewith.

4. A coordinate measuring machine according to claim 3, wherein:

the means connecting the break pulley directly to the threaded spindle includes a clamping sleeve mounted on the threaded spindle and engaging both the break pulley and the threaded spindle; and the clamping sleeve also engages the second pulley to rotate the threaded spindle therewith.

5. A coordinate measuring machine according to claim 3, wherein:

the means connecting the brake pulley directly to the threaded spindle includes a drive pulley secured to the brake pulley;

the threaded spindle forms a longitudinal groove; and the drive pulley includes a projection extending into said longitudinal groove to rotate the drive pulley and the brake pulley with the threaded spindle.

6. A coordinate measuring machine according to claim 1, wherein as the power shaft rotates, the drive belt normally moves in a predetermined path extending around the first and second pulley, and further including means to monitor deflection of the drive belt form said predetermined path, the monitor means including a ball bearing supported to engage the drive belt.

7. A coordinate measuring machine according to claim 1, wherein the means to maintain tension on the belt includes:

an angle lever supported for pivotal movement about an axis;

drive belt engagement means mounted on the angle lever to engage the belt; and means connected to the angle lever to apply a biasing force thereto to hold said drive belt engaging means in pressure engagement against the drive belt.

* * * * *

UNITED STATES PATENT AND TRADEMARK OFFICE
CERTIFICATE OF CORRECTION

PATENT NO. : 4,889,519

DATED : December 26, 1989

INVENTOR(S) : Gerhard Band

It is certified that error appears in the above-identified patent and that said Letters Patent is hereby corrected as shown below:

Column 4, line 21: "aid" should read as --said--

Column 4, line 39: "thereon;;" should read as --thereon;--

Column 6, line 2: "pulley" should read as --pulleys--

Column 6, line 3: "form" should read as --from--

Signed and Sealed this

Nineteenth Day of February, 1991

*Attest:*

HARRY F. MANBECK, JR.

*Attesting Officer*      *Commissioner of Patents and Trademarks*